United States Patent
Hu et al.

(10) Patent No.: US 11,084,494 B2
(45) Date of Patent: Aug. 10, 2021

(54) METHOD FOR DETECTING SAFETY OF DRIVING BEHAVIOR, APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Yunyan Hu, Beijing (CN); Ya Wang, Beijing (CN); Yifeng Pan, Beijing (CN); Dayang Hao, Beijing (CN); Rui Liu, Beijing (CN); Lizhi Zhang, Beijing (CN); Xiaojun Luo, Beijing (CN); Yaling Zhang, Beijing (CN); Ji Tao, Beijing (CN); Ruixiang Shen, Beijing (CN); Qihao Huang, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 241 days.

(21) Appl. No.: 16/508,667

(22) Filed: Jul. 11, 2019

(65) Prior Publication Data
US 2020/0039525 A1 Feb. 6, 2020

(30) Foreign Application Priority Data
Aug. 3, 2018 (CN) .......................... 201810878321.X

(51) Int. Cl.
*B60W 50/00* (2006.01)
*G05B 13/02* (2006.01)
(Continued)

(52) U.S. Cl.
CPC ....... *B60W 50/0098* (2013.01); *G05B 13/027* (2013.01); *G05D 1/0055* (2013.01);
(Continued)

(58) Field of Classification Search
CPC ................................................ B60W 50/0098
See application file for complete search history.

(56) References Cited

U.S. PATENT DOCUMENTS

2013/0135092 A1* 5/2013 Wu .................... B60K 28/066
340/439
2017/0132521 A1* 5/2017 Xu ........................ B60W 40/08
(Continued)

FOREIGN PATENT DOCUMENTS

| CN | 102874260 A | 1/2013 |
| CN | 104978492 A | 10/2015 |

(Continued)

OTHER PUBLICATIONS

Second Office Action issued in the Priority CN Application No. 201810878321.X; dated Oct. 18, 2019; 8 pages.
(Continued)

*Primary Examiner* — Alex C Dunn
(74) *Attorney, Agent, or Firm* — Dilworth IP, LLC

(57) ABSTRACT

A method for detecting safety of a driving behavior, an apparatus, a device and a storage medium are provided. The method includes acquiring current driving data of a vehicle during a driving process of the vehicle; determining current driving behavior feature data of the vehicle according to the current driving data of the vehicle; inputting the current driving behavior feature data of the vehicle into a real-time safety detection model and calculating a security score corresponding to current driving behavior of the vehicle; and determining whether the current driving behavior of the vehicle is safe according to the security score corresponding to the current driving behavior of the vehicle. The method can assist an optimization of a vehicle driving system, reduce a safety risk of vehicle driving, and improve a riding experience of the user.

20 Claims, 5 Drawing Sheets

(51) Int. Cl.
  *G05D 1/00*    (2006.01)
  *G06N 3/08*    (2006.01)
  *G06Q 50/26*   (2012.01)
  *B60W 40/10*   (2012.01)

(52) U.S. Cl.
  CPC ............ *G05D 1/0088* (2013.01); *G06N 3/08* (2013.01); *G06Q 50/265* (2013.01); *B60W 40/10* (2013.01); *B60W 2050/0028* (2013.01); *B60W 2050/0089* (2013.01)

(56) References Cited

U.S. PATENT DOCUMENTS

| 2018/0113458 | A1  | 4/2018 | Dong et al. |
| 2020/0074200 | A1* | 3/2020 | Krishnan ........... G06K 9/00744 |
| 2020/0216078 | A1* | 7/2020 | Katz ..................... G06F 3/017 |

FOREIGN PATENT DOCUMENTS

| CN | 106347359 A   | 1/2017 |
| CN | 106874597 A   | 6/2017 |
| CN | 107153916 A   | 9/2017 |
| CN | 108304986 A   | 7/2018 |
| EP | 3272611 A1    | 1/2018 |
| JP | 2006243856 A  | 9/2006 |
| JP | 2007172487 A  | 7/2007 |
| JP | 2014118962 A1 | 1/2017 |

OTHER PUBLICATIONS

Chinese Office Action dated Jul. 1, 2019 of corresponding application No. 201810878321.X; 8 pgs.
First Office Action issued in Parallel Japanese Patent Application No. 2019-134053 dated Jul. 14, 2020, 2 pages.
Notice of Allowance dated Jan. 22, 2020 in Corresponding Chinese Application No. 201810878321.X, 4 pages.
European Search Report dated Feb. 13, 2020 in Corresponding Euroepan Application No. 19178149.1, 6 pages.

* cited by examiner

METHOD FOR DETECTING SAFETY OF DRIVING BEHAVIOR, APPARATUS, DEVICE AND STORAGE MEDIUM

CROSS-REFERENCE TO RELATED APPLICATIONS

This application claims priority to Chinese Patent Application No. 201810878321.X, filed on Aug. 3, 2018, entitled "Method for Detecting Safety of Driving Behavior, Apparatus, Device and Storage Medium", which is incorporated herein by reference in its entirety.

FIELD

Embodiments of the present disclosure relate to the field of communication technologies, and in particular, to a method for detecting safety of a driving behavior, an apparatus, a device and a storage medium.

BACKGROUND

An intelligent vehicle is a comprehensive system which integrates environmental perception, planning and decision-making, multi-level assistant driving and other functions into one. It concentrates the use of computers, modern sensing, information fusion, communication, artificial intelligence, automatic control and other technologies, and is a typical high-tech complex. In recent years, the intelligent vehicle has become a hotspot of research in the field of vehicle engineering and a new driving force for the growth of the automobile industry in the world, and many developed countries have incorporated it into their respective development-focused intelligent transportation systems. In the near future, the intelligent vehicle will carry real users when it is put into use.

In order for the users to ride the intelligent vehicle safely, it is required that the driving behavior of the intelligent vehicle during a driving process gives the users enough sense of security. However, the current vehicle driving system has poor control performance on an intelligent vehicle and thereby the driving behavior of the intelligent vehicle during a driving process is easy to cause sense of insecurity of users, and poor driving safety of the vehicle.

SUMMARY

Embodiments of the present disclosure provide a method for detecting safety of a driving behavior, an apparatus, a device and a storage medium, to solve the problem that the current vehicle driving system has poor control performance on an intelligent vehicle and thereby driving behavior of the intelligent vehicle during a driving process is easy to cause sense of insecurity of users and poor driving safety of the vehicle.

One aspect of the embodiments of the present disclosure provides a method for detecting safety of a driving behavior, including:

acquiring current driving data of a vehicle during a driving process of the vehicle;

determining, according to the current driving data of the vehicle, current driving behavior feature data of the vehicle, where the driving behavior feature data includes a driving scene and driving data, and the driving data includes pose data, speed data and distance data of the vehicle;

inputting the current driving behavior feature data of the vehicle into a real-time safety detection model, and calculating a security score corresponding to current driving behavior of the vehicle, where the real-time safety detection model is obtained by training a neural network model via driving behavior feature data and a security marking score in a first training set; and determining whether the current driving behavior of the vehicle is safe according to the security score corresponding to the current driving behavior of the vehicle.

Another aspect of the embodiments of the present disclosure provides an apparatus for detecting safety of a driving behavior, including:

an acquisition module configured to acquire current driving data of a vehicle during a driving process of the vehicle;

a determination module configured to determine current driving behavior feature data of the vehicle according to the current driving data of the vehicle, where the driving behavior feature data includes a driving scene and driving data, and the driving data includes pose data, speed data and distance data of the vehicle;

a calculation module configured to input the current driving behavior feature data of the vehicle into a real-time safety detection model, and calculate a security score corresponding to current driving behavior of the vehicle, where the real-time safety detection model is obtained by training a neural network model via driving behavior feature data and a security marking score in a first training set; and a first processing module configured to determine whether the current driving behavior of the vehicle is safe according to the security score corresponding to the current driving behavior of the vehicle.

Another aspect of the embodiments of the present disclosure provides a device for detecting safety of a driving behavior, including:

a memory, a processor, and a computer program stored on the memory and runnable on the processor, where the method described above is implemented when the processor runs the computer program.

Another aspect of the embodiments of the present disclosure provides a computer readable storage medium having a computer program stored thereon, where the method described above is implemented when the computer program is executed by a processor.

The method for detecting safety of a driving behavior, the apparatus, the device and the storage medium provided by the embodiments of the present disclosure involve acquiring current driving data of a vehicle during a driving process of the vehicle; determining current driving behavior feature data of the vehicle according to the current driving data of the vehicle; inputting the current driving behavior feature data of the vehicle into a real-time safety detection model and calculating a security score corresponding to current driving behavior of the vehicle; and determining whether the current driving behavior of the vehicle is safe according to the security score corresponding to the current driving behavior of the vehicle. Thus, the detection of the safety of the current driving behavior of the vehicle according to whether the driving behavior of the vehicle causes the user to feel insecure is achieved. Usually, when a riding user feels insecure about the driving behavior of the vehicle, the vehicle has not been in danger, and the detection of the safety of the current driving behavior of the vehicle according to whether the driving behavior of the vehicle causes the user to feel insecure can assist an optimization of a vehicle driving system, reduce a safety risk of vehicle driving, and improve a riding experience of the user.

The embodiments of the present disclosure have been shown in the above drawings and will be described in detail below. The drawings and description are to illustrate the concept of the present disclosure for those skilled in the art by reference to specific embodiments, rather than to limit the scope of the conception of the embodiments of the present disclosure in any way.

DETAILED DESCRIPTION

Exemplary embodiments will be described in detail herein, and examples thereof are illustrated in the accompanying drawings. When the following description refers to the drawings, the same number in different drawings represents the same or similar element unless otherwise indicated. The embodiments described in the following exemplary embodiments do not represent all embodiments consistent with the embodiments of the present disclosure. Instead, they are merely examples of apparatuses and methods consistent with some aspects of the embodiments of the present disclosure as detailed in the appended claims.

Terms "first", "second", and the like involved in the embodiments of the present disclosure are used for the purpose of description only, and are not to be construed as indicating or implying a relative importance or implicitly indicating the number of technical features indicated. In descriptions of the following embodiments, the meaning of "a plurality of" refers to two or more unless specifically defined otherwise.

The following several specific embodiments may be combined with each other, and the same or similar concepts or processes may not be described again in some embodiments. The embodiments of the present disclosure will be described below with reference to the accompanying drawings.

Embodiment I

Figure 1:
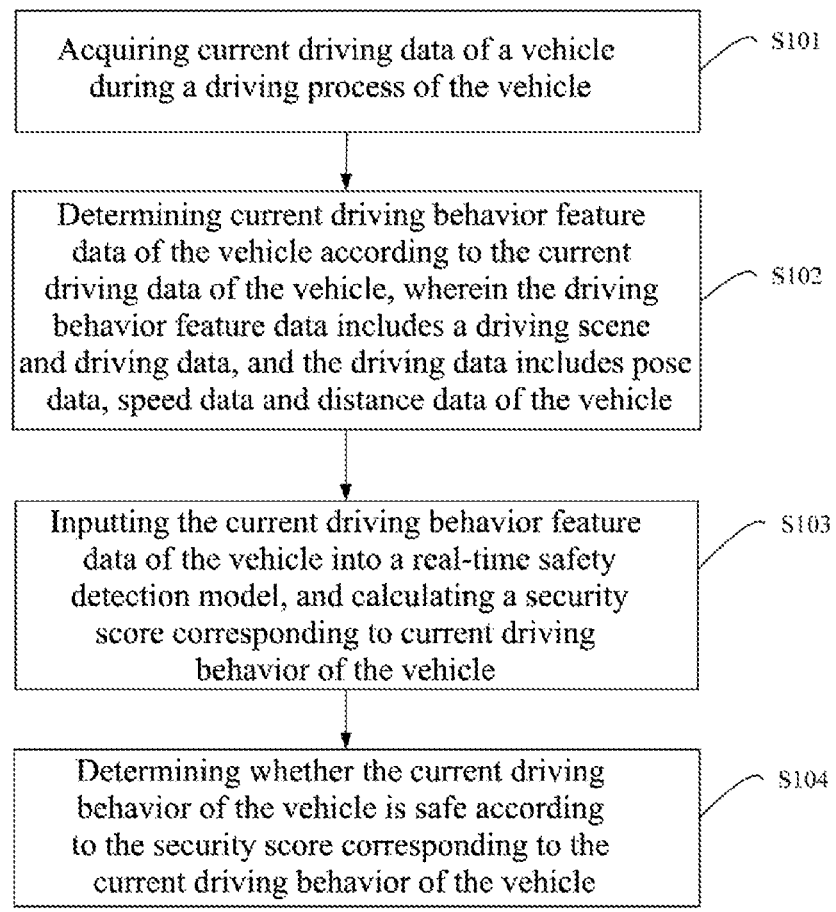
FIG. 1 is a flowchart of a method for detecting safety of a driving behavior according to Embodiment I of the present disclosure.

FIG. 1 is a flowchart of a method for detecting safety of a driving behavior according to Embodiment I of the present disclosure. The embodiment of the present disclosure provides a method for detecting safety of a driving behavior, in view of the problem that the current vehicle driving system has poor control performance on an intelligent vehicle and thereby driving behavior of the intelligent vehicle during a driving process is easy to cause sense of insecurity of users and poor driving safety of the vehicle. The method in the present embodiment is applied to a terminal device, the terminal device may be an in-vehicle terminal or a computer device that can communicate with the in-vehicle terminal, etc. In other embodiments, the method is also applied to other devices, and the present embodiment is illustrated schematically by taking a server device as an example. As shown in FIG. 1, the specific steps of the method are as follows:

Step S101: acquiring current driving data of a vehicle during a driving process of the vehicle.

The vehicle involved in the present embodiment is an intelligent vehicle that can complete automatic driving under the control of an automatic driving system.

Where the driving data of the vehicle includes all data that can be acquired by the automatic driving system for controlling the intelligent vehicle to perform automatic driving.

Specifically, the driving data may include driving environment information around the vehicle such as a traffic element, a road element and an obstacle element; pose data of the vehicle; speed data of the vehicle such as a lateral driving speed, a longitudinal driving speed, and speeds of the vehicle relative to a traffic element, a road elements and an obstacle element; distance data such as distances of the vehicle relative to a traffic element, a road element and an obstacle element; and a navigation route and vehicle control information for controlling driving of the vehicle, and the like, and the embodiment of the present disclosure does not specifically limit the driving data herein.

The road element may include a lane line, an intersection stop line, a crosswalk, a speed bump, a highway toll station, and the like. For example, the lane line may include the following information: presence or absence of a lane line, a white solid line, a white dashed line, a white dashed-solid line, a double white solid line, a yellow solid line, a yellow dashed line, a yellow dashed-solid line, a double yellow solid line, and the like.

The traffic element may include traffic signal information, speed limit information, and the like.

The obstacle element may include a static obstacle such as a fence on the road, a green belt, a cone, a plant that invades a road, a road pile, a sign, a manhole cover that protrudes from a road, and other road foreign object, and also may include a vehicle in driving such as a small motor vehicle, a bus, a large truck, a bicycle, a non-motor vehicle and a special vehicle (such as a police car, an ambulance, a fire engine, etc.), and a dynamic obstacle such as a pedestrian, an animal and other dynamic foreign object.

The road element, the traffic element and the obstacle element in the present embodiment may further include other object in other road environment that may affect the automatic driving of the intelligent vehicle during the driving process of the intelligent vehicle. The present embodiment does not specifically limit this herein.

Step S102: determining current driving behavior feature data of the vehicle according to the current driving data of the vehicle, where the driving behavior feature data includes a driving scene and driving data, and the driving data includes pose data, speed data and distance data of the vehicle.

Where the driving scene is a specific scene in which a plurality of vehicles is driving summarized in advance according to a large amount of historical data. The driving scene may include at least following scenes such as vehicle following, straight driving, turning, lane changing, U-turn, starting, parking and loop driving.

For example, the turning scene may specifically include a left turn and a right turn; the lane changing scene may specifically include planning a lane change to the left and planning a lane change to the right; the parking scene may specifically include terminal parking, pull-over parking, reverse parking, parallel parking, forward parking, and the like; the loop driving scene can specifically include entering the loop, leaving the loop, driving on the loop, and the like.

In addition, in the present embodiment, the type of driving scene and the specific conditions for determining the current scene of the vehicle can be set by the skilled in the art according to an actual situation, and the present embodiment does not specifically limit them.

In the present embodiment, the speed data includes a lateral driving speed, a longitudinal driving speed, and speeds of the vehicle relative to a road element, a traffic element and an obstacle element. The distance data includes distances of the vehicle relative to the road element, the traffic element and the obstacle element.

In this step, the determining current driving behavior feature data of the vehicle according to the current driving data of the vehicle, may be specifically realized by the method in the prior art of determining the driving scene of the vehicle and driving data such as pose data, speed data and distance data of the vehicle according to the driving data of the vehicle, which will not be repeated in the present embodiment.

In addition, the driving scene, the road element, the traffic element and obstacle element in the present embodiment can be increased or decreased according to an actual situation of the vehicle in a practical application, and the present embodiment does not specifically limit this.

Step S103: inputting the current driving behavior feature data of the vehicle into a real-time safety detection model, and calculating a security score corresponding to current driving behavior of the vehicle.

Where the input data into the real-time safety detection model is driving behavior feature data corresponding to the vehicle at a certain moment, and output data is a security score corresponding to driving behavior of the vehicle at this moment.

In the present embodiment, the real-time safety detection model is obtained by training a neural network model by driving behavior feature data and a security marking score in a first training set. The first training set includes multiple pieces of training data, and each piece of training data is a set of data consisting of the driving behavior feature data of the vehicle and a corresponding security marking score.

The first training set can be obtained based on collecting a large amount of real historical driving data. Specifically, a large number of users may ride the vehicle under a plurality of different road network conditions; during the driving process of the vehicle, a user riding the vehicle can send user insecurity description information in real time when the user feels insecure, and give a corresponding security marking score. A terminal device on the vehicle receives the user insecurity description information, and analyzes the user insecurity description information to obtain the moment when the user feels insecure and the corresponding security marking score.

Optionally, the terminal device can directly collect the user insecurity description information; or other data acquisition apparatus for acquiring the user insecurity description information in real time can be installed on the vehicle, and the terminal device can receive the user insecurity description information collected and transmitted by the data acquisition apparatus. Where the data acquisition apparatus can be any apparatus that can collect the user insecurity description information in real time, and the present embodiment does not specifically limit this.

Optionally, the user insecurity description information can be voice information. The users riding the vehicle can dictate in real time the information that insecurity is generated, describe the driving scene in which the insecurity is generated, and give the security marking score; and the terminal device on the vehicle can collect the voice information of the user in real time. After the end of the driving process, the terminal device can perform a semantic analysis processing on the voice information of the user riding the vehicle collected during the driving process, and determine the moment when the preset description information appears in the user insecurity description information and the security marking score corresponding to the moment when the preset description information appears, thereby obtaining multiple pieces of training data corresponding to the driving process.

Where the preset description information can be information indicating the insecurity of the user, for example, it can be "dangerous", "unsafe", and the like. The preset description information can be set by a skilled person according to an actual condition, and the present embodiment does not specifically limit this.

Step S104: determining whether the current driving behavior of the vehicle is safe according to the security score corresponding to the current driving behavior of the vehicle.

Specifically, according to the security score corresponding to the current driving behavior of the vehicle, if the security score corresponding to the current driving behavior of the vehicle is low, the current driving behavior of the vehicle can be determined to be unsafe; if the security score corresponding to the current driving behavior of the vehicle is high, the current driving behavior of the vehicle can be determined to be safe.

This embodiment of the present disclosure includes acquiring current driving data of a vehicle during a driving process of the vehicle; determining current driving behavior feature data of the vehicle according to the current driving data of the vehicle; inputting the current driving behavior feature data of the vehicle into a real-time safety detection model and calculating a security score corresponding to current driving behavior of the vehicle; and determining whether the current driving behavior of the vehicle is safe according to the security score corresponding to the current driving behavior of the vehicle. Thus, the detection of the safety of the current driving behavior of the vehicle according to whether the driving behavior of the vehicle causes the user to feel insecure is achieved. Usually, when a riding user feels insecure about the driving behavior of the vehicle, the vehicle has not been in danger, and the detection of the safety of the current driving behavior of the vehicle according to whether the driving behavior of the vehicle causes the user to feel insecure can assist an optimization of a vehicle driving system, reduce a safety risk of vehicle driving, and improve a riding experience of the user.

Embodiment II

Figure 2:
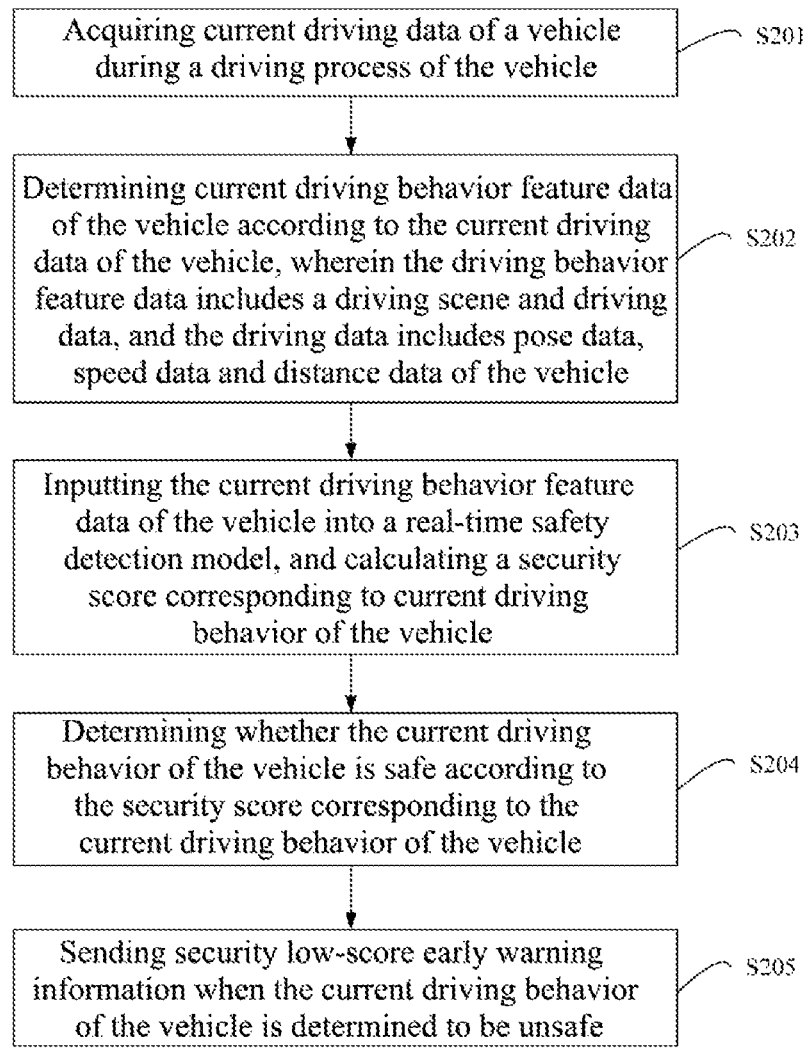
FIG. 2 is a flowchart of a method for detecting safety of a driving behavior according to Embodiment II of the present disclosure.

FIG. 2 is a flowchart of a method for detecting safety of a driving behavior according to Embodiment II of the present disclosure. On the basis of Embodiment I described above, in the present embodiment, after determining that the current driving behavior of the vehicle is unsafe, the method further includes: sending security low-score early warning information. As shown in FIG. 2, the specific steps of the method are as follows:

Step S201: acquiring current driving data of a vehicle during a driving process of the vehicle.

This step is consistent with the step S101 described above, and will not be repeated in the present embodiment.

Optionally, in this embodiment, the detection of driving behavior safety of the vehicle can be controlled by a time window. The size of the time window may not be fixed, and may be set by a skilled person according to actual needs.

Step S202: determining current driving behavior feature data of the vehicle according to the current driving data of the vehicle, where the driving behavior feature data includes a driving scene and driving data, and the driving data includes pose data, speed data and distance data of the vehicle.

This step is consistent with the step S102 described above, and will not be repeated in the present embodiment.

Optionally, a detection set of driving scenes in which safety of the driving behavior of the vehicle needs to be detected can also be preset, and after determining the current driving behavior feature data of the vehicle, whether current driving scene of the vehicle belongs to the detection set of driving scenes described above can be determined; if yes, the subsequent steps S203 to S205 are performed; and if not, the process is stopped, and the subsequent steps S203 to S205 are not performed.

Step S203: inputting the current driving behavior feature data of the vehicle into a real-time safety detection model, and calculating a security score corresponding to current driving behavior of the vehicle.

Where the input data into the real-time safety detection model is driving behavior feature data corresponding to the vehicle at a certain moment, and output data is a security score corresponding to driving behavior of the vehicle at this moment.

In the present embodiment, the real-time safety detection model is obtained by training a neural network model by driving behavior feature data and security marking score in a first training set. The first training set includes multiple pieces of training data, and each piece of training data is a set of data consisting of the driving behavior feature data of the vehicle and a corresponding security marking score.

The first training set can be obtained based on collecting a large amount of real historical driving data. Specifically, acquiring the first training set can be specifically implemented in the following manner:

acquiring a moment when an insecurity is generated during a historical driving process of a vehicle, and the security marking score and historical driving data corresponding to the moment when the insecurity is generated; determining the driving behavior feature data corresponding to the moment when the insecurity is generated according to the historical driving data corresponding to the moment when the insecurity is generated; and taking the driving behavior feature data and the security marking score, corresponding to the moment when the insecurity is generated, as a piece of training data, and adding it to the first training set.

The acquiring a moment when an insecurity is generated during a historical driving process of a vehicle, and a security marking score and historical driving data corresponding to the moment when the insecurity is generated, can be specifically implemented in the following manner:

acquiring overall driving process data and user insecurity description information corresponding to a plurality of historical driving processes of the vehicle in different driving environments, where the user insecurity description information is information recorded during the driving process of the vehicle to describe the insecurity of the user riding the vehicle; for any one historical driving process, determining a moment when preset description information appears in the user insecurity description information and the security marking score corresponding to the moment when the preset description information appears, according to the user insecurity description information corresponding to the historical driving process; and determining historical driving data corresponding to the moment when the preset description information appears according to the overall driving process data corresponding to the driving process.

Where the moment when the preset description information appears in the user insecurity description information is a time point at which the insecurity is generated during the historical driving process.

Specifically, vehicle riding experience and testing are performed by a large number of users under a variety of different road network conditions and a variety of different weather conditions to obtain the overall driving process data and the user insecurity description information corresponding to a plurality of historical driving processes of the vehicle in different driving environments. For each driving process, a terminal device can record the overall driving process data of the vehicle during the driving process of the vehicle; the user riding the vehicle can send the user insecurity description information in real time when the user feels insecure and give a corresponding security marking score. The terminal device on the vehicle will receive the user insecurity description information, and analyzes the user insecurity description information to obtain the moment when the user feels insecure and a corresponding security marking score.

Optionally, the terminal device can directly collect the user insecurity description information; or other data acquisition apparatus for acquiring the user insecurity description information in real time can be installed on the vehicle, and the terminal device can receive the user insecurity description information collected and transmitted by the data acquisition apparatus. Where the data acquisition apparatus can be any apparatus that can collect the user insecurity description information in real time, and the present embodiment does not specifically limit this.

Optionally, the user insecurity description information can be voice information. The users riding the vehicle can dictate in real time the information that insecurity is generated, describe the driving scene in which the insecurity is generated, and give the security marking score; and the terminal device on the vehicle can collect the voice information of the user in real time. After the end of the driving process, the terminal device can perform a semantic analysis processing on the voice information of the user riding the vehicle collected during the driving process, and determine the moment when the preset description information appears in the user insecurity description information and the security marking score corresponding to the moment when the preset description information appears, thereby obtaining multiple pieces of training data corresponding to the driving process.

Where the preset description information can be information indicating the insecurity of the user, for example, it can be "dangerous", "unsafe", and the like. The preset description information can be set by a skilled person according to an actual condition, and the present embodiment does not specifically limit this.

In addition, the determining historical driving data corresponding to the moment when the preset description information appears according to the overall driving process data corresponding to the driving process can specifically determine a driving scene corresponding to the moment when the preset description information appears, and acquire historical driving data of the vehicle within a time range related to the driving scene; or can acquire historical driving data of the vehicle within a preset time range in which the preset description information appears according to the moment when the preset description information appears; or can also determine the historical driving data corresponding to the time when the preset description information appears by adopting other methods, and the present embodiment does not specifically limit this.

Where the preset time range can be set by a skilled person according to an actual need, and the present embodiment does not specifically limit this.

Optionally, when the first training set is adopted to train a driving process security detection model, the first training set can be split into two subsets, a first subset, which is configured to train the driving process security detection model, and a second subset, which is configured to test an accuracy of the driving process safety detection model obtained after training through the first subset, and the driving process safety detection model can be put into use when the accuracy of the driving process safety detection model reaches a preset first accuracy. Where the preset first accuracy can be set by a skilled person according to an actual need, and the present embodiment does not specifically limit this.

Step S204: determining whether the current driving behavior of the vehicle is safe according to the security score corresponding to the current driving behavior of the vehicle.

Specifically, whether the security score corresponding to the current driving behavior of the vehicle is lower than a preset early warning threshold can be determined according to the preset early warning threshold.

If the security score corresponding to the current driving behavior of the vehicle is lower than the preset early warning threshold, the current driving behavior of the vehicle is determined to be unsafe, and step S205 is performed.

If the security score corresponding to the current driving behavior of the vehicle is not lower than the preset early warning threshold, that is, the security score corresponding to the current driving behavior of the vehicle is equal to or higher than the preset early warning threshold, the current driving behavior of the vehicle is determined to be safe, and no operation or prompt is required at this time.

Where the preset early warning threshold can be set by a skilled person according to an actual need, and the present embodiment does not specifically limit this.

Step S205: sending security low-score early warning information when the current driving behavior of the vehicle is determined to be unsafe.

Where the security low-score early warning information can be voice prompt information, or a warning signal, or visual information displayed on a display apparatus of the vehicle, and the like, and the present embodiment does not specifically limit this.

Optionally, a current moment can also be determined as an unsafe moment during the driving process of the vehicle, when the current driving behavior of the vehicle is determined to be unsafe; an unsafe level corresponding to the unsafe moment is determined according to the current driving behavior feature data of the vehicle and boundary information of a preset unsafe level.

Optionally, the sent security low-score early warning information can include the unsafe level corresponding to the current unsafe moment.

In this embodiment of the present disclosure, by determining a current driving behavior of a vehicle to be unsafe and sending security low-score early warning information, when a security score corresponding to the current driving behavior of the vehicle is lower than a preset early warning threshold, it is possible to remind a driver or a passenger of the vehicle to determine whether a current vehicle control is reasonable, and assist the driver or the passenger in controlling the vehicle, thereby improving the driving safety of the vehicle.

Embodiment III

Figure 3:
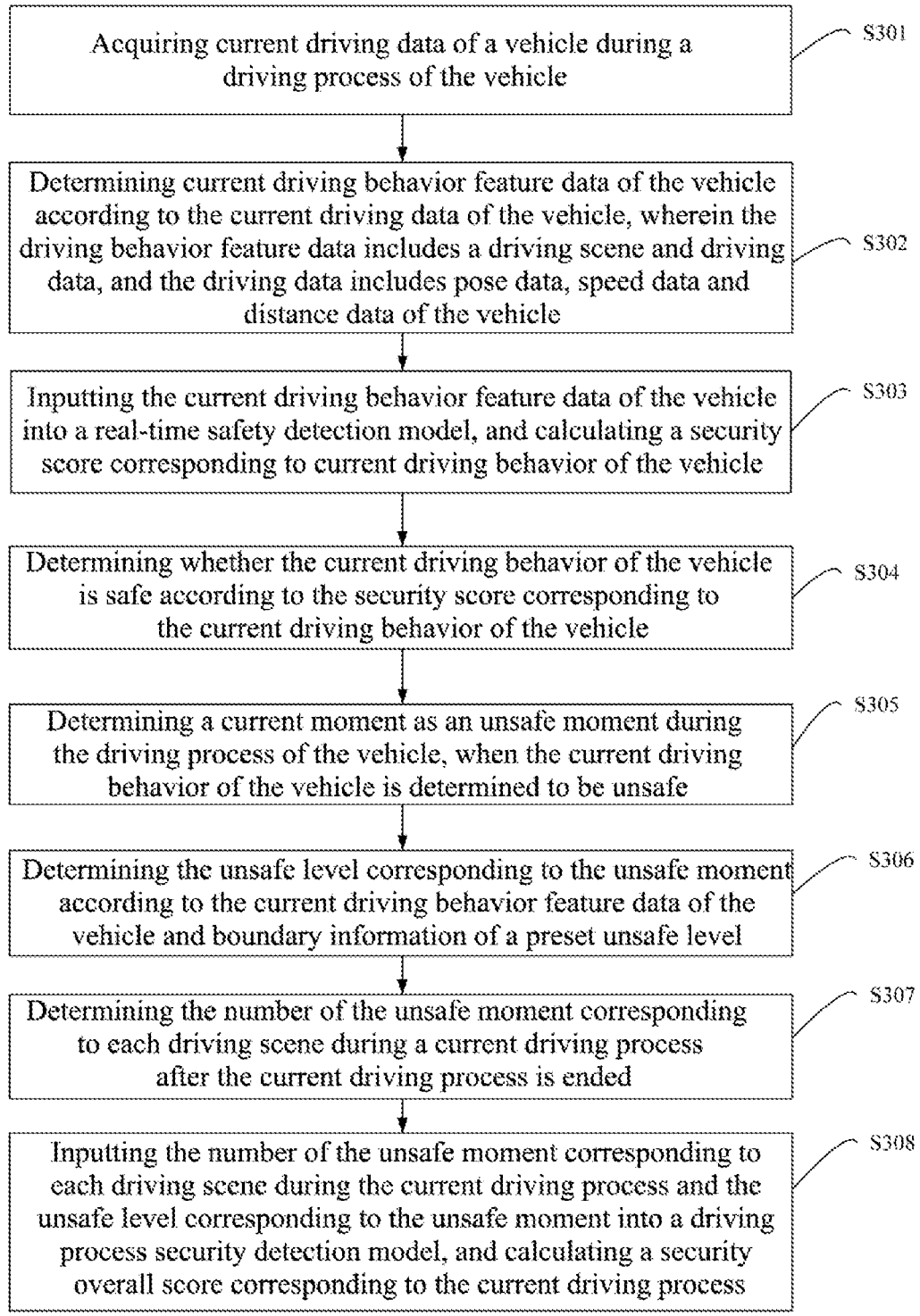
FIG. 3 is a flowchart of a method for detecting safety of a driving behavior according to Embodiment III of the present disclosure.

FIG. 3 is a flowchart of a method for detecting safety of a driving behavior according to Embodiment III of the present disclosure. On the basis of Embodiment I or Embodiment II described above, in the present embodiment, after the end of the current driving process, the safety of the current driving process of the vehicle can also be detected by the driving process security detection model, and a security overall score corresponding to the current driving process can be calculated. As shown in FIG. 3, the specific steps of the method are as follows:

Step S301: acquiring current driving data of a vehicle during a driving process of the vehicle.

This step is consistent with the step S201 described above, and will not be repeated in the present embodiment.

Step S302: determining current driving behavior feature data of the vehicle according to the current driving data of the vehicle, where the driving behavior feature data includes a driving scene and driving data, and the driving data includes pose data, speed data and distance data of the vehicle.

This step is consistent with the step S202 described above, and will not be repeated in the present embodiment.

Step S303: inputting the current driving behavior feature data of the vehicle into a real-time safety detection model, and calculating a security score corresponding to current driving behavior of the vehicle.

This step is consistent with the step S203 described above, and will not be repeated in the present embodiment.

Step S304: determining whether the current driving behavior of the vehicle is safe according to the security score corresponding to the current driving behavior of the vehicle.

This step is consistent with the step S204 described above, and will not be repeated in the present embodiment.

Step S305: determining a current moment as an unsafe moment during the driving process of the vehicle, when the current driving behavior of the vehicle is determined to be unsafe.

In the present embodiment, during the current driving process, the current moment is recorded as an unsafe moment during the driving process of the vehicle, whenever the current driving behavior of the vehicle is determined to be unsafe.

Step S306: determining the unsafe level corresponding to the unsafe moment according to the current driving behavior feature data of the vehicle and boundary information of a preset unsafe level.

In the present embodiment, for different driving scenes, one or more unsafe levels can be preset for each driving scene, and boundary information of each unsafe level can be provided.

Where the boundary information of the unsafe level can include one or more core indicators that affect the psychological security feeling of the user in the driving scene.

For example, the core indicators in a vehicle following scene can include a safety time interval, and the safety time interval is determined by the speed of both a host vehicle and a front vehicle, and the distance between the host vehicle and the front vehicle.

Optionally, the boundary information of the unsafe level can be an exact set of exact boundary values, or can be an interval distribution. The boundary information of unsafe level can be specifically obtained by analysis and statistics of the historical driving data, and the embodiment does not specifically limit this.

For example, for a vehicle following scene, for a normal city road, a distance between a front vehicle and a rear vehicle in a first test can be set to 300 meters, the front vehicle drives uniformly at various speeds of 0 km/h, 10 km/h, 20 km/h, 30 km/h, 40 km/h, 50 km/h, etc., the rear vehicle drives uniformly at various speeds of 10 km/h, 20 km/h, 30 km/h, 40 km/h, 50 km/h, 60 km/h, etc., a plurality of groups of experiments are carried out by permutation and combination of various situations, with a plurality of groups of users respectively taking different positions such as a co-pilot position, a left rear row, a middle rear row, a right rear row of a plurality of vehicles, and the user can use a mobile terminal or an data acquisition apparatus of the vehicle to record the moment when the insecurity is generated due to the fact that the host vehicle is too close to the front vehicle during the driving process and record a security marking score.

Step S307: determining the number of the unsafe moment corresponding to each driving scene during a current driving process after the current driving process is ended.

Step S308: inputting the number of the unsafe moment corresponding to each driving scene during the current driving process and the unsafe level corresponding to the unsafe moment into a driving process security detection model, and calculating a security overall score corresponding to the current driving process.

Where the driving process safety detection model is obtained by training a neural network model by the number of the unsafe moment corresponding to each driving scene during a historical driving process in a second training set, the unsafe level corresponding to the unsafe moment, and a overall marking score corresponding to the historical driving process.

The second training set includes multiple pieces of training data, and each piece of training data is a set of data consisting of the number of the unsafe moment corresponding to each driving scene corresponding to a complete driving process, the unsafe level corresponding to the unsafe moment, and the security overall score. The second training set can be obtained according to a large amount of collected real historical driving data.

The security overall score in each set of training data in the second training set can be obtained by actually scoring the security of the overall driving process by the user riding the vehicle after the end of each historical driving process.

The specific determination methods of the number of the unsafe moment corresponding to each driving scene corresponding to each historical driving process in each set of training data in the second training set, and the unsafe level corresponding to the unsafe moment are similar to those of the steps S301 to S307 described above, and will not be repeated in the present embodiment.

Optionally, in the driving process safety detection model, different weights can be set for different driving scenes, and weight values in the driving process safety detection model can be trained by the second training set.

Optionally, when the second training set is adopted to train the driving process security detection model, the second training set can be split into two subsets, a first subset, which is configured to train the driving process security detection model, and a second subset, which is configured to test an accuracy of the driving process safety detection model obtained after training through the first subset, and the driving process safety detection model can be put into use when the accuracy of the driving process safety detection model reaches a preset second accuracy. Where the preset second accuracy can be set by a skilled person according to an actual need, and the present embodiment does not specifically limit this.

In addition, since any one driving process can be disassembled into a combination of typical driving scenes, the driving process safety detection model has a certain universality of the road network. In order to ensure the completeness of the driving process security detection model, a data sampling process needs to collect a large amount of sample data of various driving scenes comprehensively, and after a basic model is trained, it needs to be tested and applied on the road, and then the test data can be used to further assist in optimizing the model and improving the accuracy of the model. Such iterative process can performed over and over again.

In this embodiment of the present disclosure, by inputting the number of the unsafe moment corresponding to each driving scene and the unsafe level corresponding to the unsafe moment during the current driving process into the driving process security detection model, and calculating the security overall score corresponding to the current driving process, it is possible to evaluate the safety of the vehicle driving system and provide a judgment basis for determining whether the automatic driving vehicle has the ability to safely get on the road.

Embodiment IV

Figure 4:
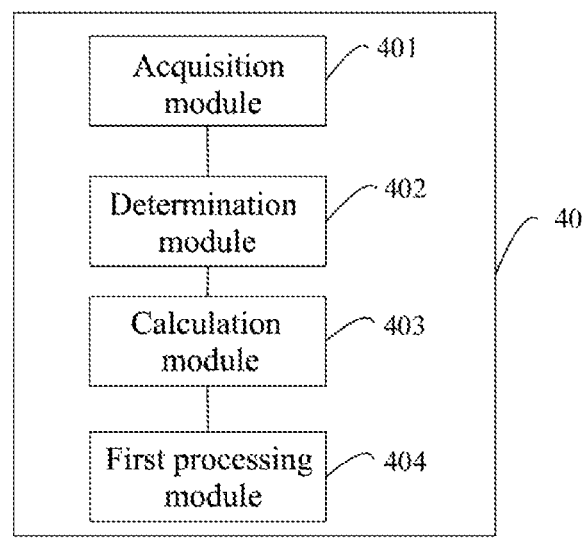
FIG. 4 is a schematic structural diagram of an apparatus for detecting safety of a driving behavior according to Embodiment IV of the present disclosure.

FIG. 4 is a schematic structural diagram of an apparatus for detecting safety of a driving behavior according to Embodiment IV of the present disclosure. The apparatus for detecting safety of a driving behavior provided by this embodiment of the present disclosure can perform the processing flow provided by an embodiment of the method for detecting safety of a driving behavior. As shown in FIG. 4, an apparatus 40 includes an acquisition module 401, a determination module 402, a calculation module 403, and a first processing module 404.

Specifically, the acquisition module 401 is configured to acquire current driving data of a vehicle during a driving process of the vehicle.

The determination module 402 is configured to determine current driving behavior feature data of the vehicle according to the current driving data of the vehicle, where the driving behavior feature data includes a driving scene and driving data, and the driving data includes pose data, speed data and distance data of the vehicle.

The calculation module 403 is configured to input the current driving behavior feature data of the vehicle into a real-time safety detection model, and calculate a security score corresponding to current driving behavior of the vehicle, where the real-time safety detection model is obtained by training a neural network model by the driving behavior feature data and a security marking score in a first training set.

The first processing module 404 is configured to determine whether the current driving behavior of the vehicle is safe according to the security score corresponding to the current driving behavior of the vehicle.

The apparatus provided in this embodiment of the present disclosure can be specifically configured to implement the method embodiment provided in Embodiment I described above, and the specific functions will not be repeated herein.

Where the driving scene at least includes vehicle following, straight driving, turning, lane changing, U-turn, starting, parking and loop driving.

The speed data includes a lateral driving speed, a longitudinal driving speed, and speeds of the vehicle relative to a road element, a traffic element and an obstacle element.

The distance data includes a distance of the vehicle relative to a road element, a traffic element and an obstacle element.

This embodiment of the present disclosure involves acquiring current driving data of a vehicle during a driving process of the vehicle; determining current driving behavior feature data of the vehicle according to the current driving data of the vehicle; inputting the current driving behavior feature data of the vehicle into a real-time safety detection model and calculating a security score corresponding to current driving behavior of the vehicle; and determining whether the current driving behavior of the vehicle is safe according to the security score corresponding to the current driving behavior of the vehicle. Thus the detection of the safety of the current driving behavior of the vehicle according to whether the driving behavior of the vehicle causes the user to feel insecure is achieved. Usually, when a riding user feels insecure about the driving behavior of the vehicle, the vehicle has not been in danger, and the detection of the safety of the current driving behavior of the vehicle according to whether the driving behavior of the vehicle causes the user to feel insecure can assist an optimization of a vehicle driving system, reduce a safety risk of vehicle driving, and improve a riding experience of the user.

Embodiment V

Figure 5:
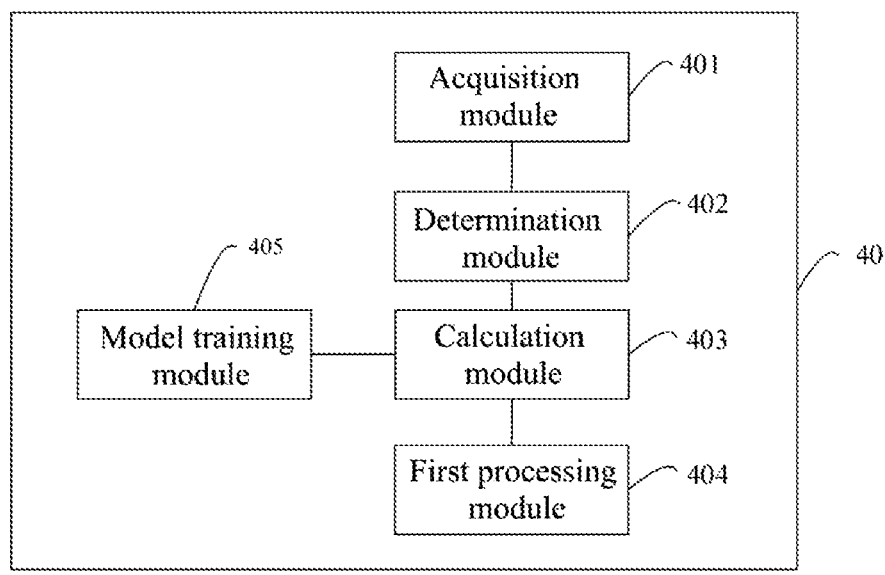
FIG. 5 is a schematic structural diagram of an apparatus for detecting safety of a driving behavior according to Embodiment V of the present disclosure.

FIG. 5 is a schematic structural diagram of an apparatus for detecting safety of a driving behavior according to Embodiment V of the present disclosure. On the basis of Embodiment IV described above, in the present embodiment, as shown in FIG. 5, the apparatus 40 further includes a model training module 405.

Specifically, the model training module 405 is configured to:

acquire a moment when an insecurity is generated during a historical driving process of a vehicle, and the security marking score and the historical driving data corresponding to the moment when the insecurity is generated; determine driving behavior feature data corresponding to the moment when the insecurity is generated according to the historical driving data corresponding to the moment when the insecurity is generated; and take the driving behavior feature data and the security marking score corresponding to the moment when the insecurity is generated as a piece of training data, and add it to a first training set.

Optionally, the model training module 405 is further configured to:

acquire overall driving process data and user insecurity description information corresponding to a plurality of historical driving processes of the vehicle in different driving environments, where the user insecurity description information is information recorded during the driving process of the vehicle to describe the insecurity of the user riding the vehicle; for any one historical driving process, determine a moment when a preset description information appears in the user insecurity description information and the security marking score corresponding to the moment when the preset description information appears, according to the user insecurity description information corresponding to the historical driving process; determine historical driving data corresponding to the moment when the preset description information appears according to the overall driving process data corresponding to the driving process.

Where the moment when the preset description information appears in the user insecurity description information is a time point when the insecurity is generated during the historical driving process.

Optionally, the first processing module 404 is further configured to:

determine whether the security score corresponding to the current driving behavior of the vehicle is lower than a preset early warning threshold; determine that the current driving behavior of the vehicle is unsafe when the security score corresponding to the current driving behavior of the vehicle is lower than the preset early warning threshold; and determine that the current driving behavior of the vehicle is safe when the security score corresponding to the current driving behavior of the vehicle is not lower than the preset early warning threshold.

Optionally, the first processing module 404 is further configured to send security low-score early warning information.

The apparatus provided in this embodiment of the present disclosure can be specifically configured to implement the method embodiment provided in Embodiment II described above, and the specific functions will not be repeated here.

In this embodiment of the present disclosure, by determining a current driving behavior of a vehicle to be unsafe and sending security low-score early warning information, when a security score corresponding to the current driving behavior of the vehicle is lower than a preset early warning threshold, it is possible to remind a driver or a passenger of the vehicle to determine whether a current vehicle control is reasonable, and assist the driver or the passenger in controlling the vehicle, thereby improving the driving safety of the vehicle.

Embodiment VI

Figure 6:
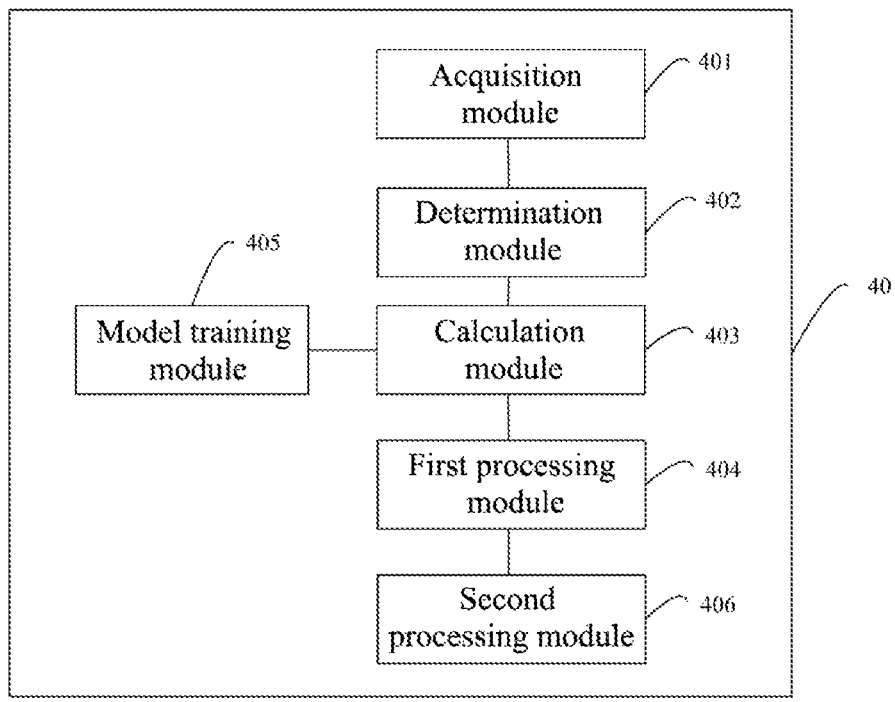
FIG. 6 is a schematic structural diagram of an apparatus for detecting safety of a driving behavior according to Embodiment VI of the present disclosure.

FIG. 6 is a schematic structural diagram of an apparatus for detecting safety of a driving behavior according to Embodiment VI of the present disclosure. On the basis of Embodiment I or Embodiment II described above, in the present embodiment, the first processing module 404 is further configured to:

determine a current moment as an unsafe moment during the driving process of the vehicle, when the current driving behavior of the vehicle is determined to be unsafe; determine an unsafe level corresponding to the unsafe moment according to current driving behavior feature data of the vehicle and boundary information of a preset unsafe level.

As shown in FIG. 6, the apparatus 40 further includes a second processing module 406. The second processing module 406 is configured to:

determine the number of the unsafe moment corresponding to each driving scene during the current driving process, after the current driving process is ended.

The second processing module 406 is further configured to: input the number of the unsafe moment corresponding to each driving scene during the current driving process and the unsafe level corresponding to the unsafe moment into a driving process security detection model, and calculate a security overall score corresponding to the current driving process; where the driving process safety detection model is obtained by training a neural network model by the number of the unsafe moment corresponding to each driving scene during a historical driving process in a second training set, the unsafe level corresponding to the unsafe moment, and the overall marking score corresponding to the historical driving process.

The apparatus provided in this embodiment of the present disclosure can be specifically configured to implement the method embodiment provided in Embodiment III described above, and the specific functions will not be repeated here.

In this embodiment of the present disclosure, by inputting the number of the unsafe moment corresponding to each driving scene and the unsafe level corresponding to the unsafe moment during the current driving process into the driving process security detection model, and calculating the security overall score corresponding to the current driving process, it is possible to evaluate the safety of the vehicle driving system and provide a judgment basis for determining whether the automatic driving vehicle has the ability to safely get on the road.

Embodiment VII

Figure 7:
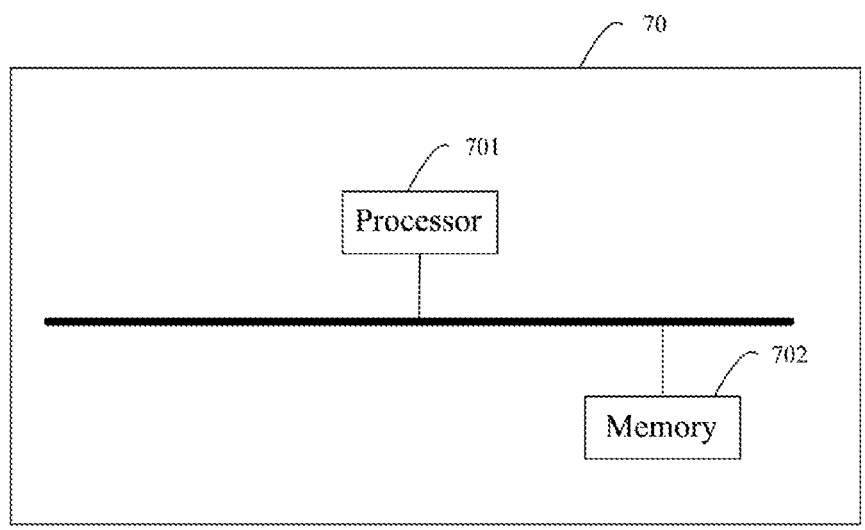
FIG. 7 is a schematic structural diagram of a device for detecting safety of a driving behavior according to Embodiment VII of the present disclosure.

FIG. 7 is a schematic structural diagram of a device for detecting safety of a driving behavior according to Embodiment VII of the present disclosure. As shown in FIG. 7, a device 70 includes a processor 701, a memory 702, and a computer program stored on the memory 702 and executable by the processor 701.

The processor 701 implements the method for detecting safety of a driving behavior provided by any one of the above method embodiments when executing the computer program stored on the memory 702.

This embodiment of the present disclosure involves acquiring current driving data of a vehicle during a driving process of the vehicle; determining current driving behavior feature data of the vehicle according to the current driving data of the vehicle; inputting the current driving behavior feature data of the vehicle into a real-time safety detection model and calculating a security score corresponding to current driving behavior of the vehicle; and determining whether the current driving behavior of the vehicle is safe according to the security score corresponding to the current driving behavior of the vehicle. Thus the detection of the safety of the current driving behavior of the vehicle according to whether the driving behavior of the vehicle causes the user to feel insecure is achieved. Usually, when a riding user feels insecure about the driving behavior of the vehicle, the vehicle has not been in danger, and the detection of the safety of the current driving behavior of the vehicle according to whether the driving behavior of the vehicle causes the user to feel insecure can assist an optimization of a vehicle driving system, reduce a safety risk of vehicle driving, and improve a riding experience of the user.

In addition, an embodiment of the present disclosure provides a computer readable storage medium, having stored thereon a computer program that, when being executed by a processor, implements the method of any one of the above method embodiments.

In the several embodiments provided by the present application, it should be understood that the disclosed apparatus and method may be implemented in other manners. For example, the apparatus embodiments described above are merely illustrative. For example, the division of the units is only a logical function division, and there may be other division manner in actual implementation; for example, multiple units or components can be combined or integrated into another system, or some features can be ignored or not be executed. In addition, the mutual coupling or direct coupling or communication connection shown or discussed may be an indirect coupling or communication connection through some interfaces, apparatuses or units, and may be in an electrical, mechanical or other form.

An unit described as a separate component may or may not be physically separated, and a component displayed as a unit may or may not be a physical unit, that is, they may be located in one place, or may be distributed to multiple network units. Some or all the units may be selected according to an actual need, to achieve purposes of the solutions of the embodiments.

In addition, each functional unit in each embodiment of the present disclosure may be integrated into one processing unit, or each unit may exist physically separately, or two or more units may be integrated into one unit. The above integrated unit can be implemented in the form of hardware or in the form of hardware plus a software functional unit.

The integrated unit implemented in the form of a software functional unit as described above can be stored in a computer readable storage medium. The above software functional unit is stored in a storage medium and includes instructions for causing a computer device (may be a personal computer, a server, or a network device, etc.) or a processor to perform part of the steps of the methods according to the various embodiments of the present disclosure. The above storage medium includes media that store a program code, such as a U disk, a mobile hard disk, a read-only memory (ROM), a random access memory (RAM), a magnetic disk, or an optical disk.

Those skilled in the art can clearly understand that for convenience and brevity of description, only the division of the functional modules described above is given as an example. In a practical application, the above functions can be assigned to different functional modules as required, that is, the internal structure of the apparatus can be divided into different functional modules to perform all or part of the functions described above. For the specific working process of the apparatus described above, reference may be made to corresponding processes in the above method embodiments, and it will not be repeated here.

Other embodiments of the present disclosure will be readily apparent to those skilled in the art after considering the specification and practicing the invention disclosed herein. the present disclosure is intended to cover any of the variations, uses, or adaptive changes of the present disclosure, and these variations, uses, or adaptive changes follow the general principles of the present disclosure and include common knowledge or conventional technical means in this technical field not disclosed by the present disclosure. The specification and examples are to be regarded as illustrative only, and the true scope and spirit of the present disclosure are indicated in the claims below.

It will be understood that the present disclosure is not limited to the precise structure described above and shown in the accompanying drawings, and may be modified and changed in various ways without deviating from its scope. The scope of the present disclosure is only subject to the appended claims.

What is claimed is:

1. A method for detecting safety of a driving behavior, comprising:
   acquiring current driving data of a vehicle during a driving process of the vehicle;
   determining, according to the current driving data of the vehicle, current driving behavior feature data of the vehicle, wherein the driving behavior feature data includes a driving scene and driving data, and the driving data includes pose data, speed data and distance data of the vehicle;
   inputting the current driving behavior feature data of the vehicle into a real-time safety detection model, and calculating a security score corresponding to current driving behavior of the vehicle, wherein the real-time safety detection model is obtained by training a neural network model via driving behavior feature data and a security marking score in a first training set; and
   determining whether the current driving behavior of the vehicle is safe according to the security score corresponding to the current driving behavior of the vehicle.

2. The method of claim 1, wherein the driving scene at least comprises: vehicle following, straight driving, turning, lane changing, making a U-turn, starting, parking and loop driving;
   the speed data comprises a lateral driving speed, a longitudinal driving speed, and speeds of the vehicle relative to a road element, a traffic element and an obstacle element; and
   the distance data comprises distances of the vehicle relative to the road element, the traffic element and the obstacle element.

3. The method of claim 1, wherein the determining whether the current driving behavior of the vehicle is safe according to the security score corresponding to the current driving behavior of the vehicle, comprises:
   determining whether the security score corresponding to the current driving behavior of the vehicle is lower than a preset early warning threshold;
   determining the current driving behavior of the vehicle to be unsafe when the security score corresponding to the current driving behavior of the vehicle is lower than the preset early warning threshold; and
   determining the current driving behavior of the vehicle to be safe when the security score corresponding to the current driving behavior of the vehicle is not lower than the preset early warning threshold.

4. The method of claim 3, wherein after the determining the current driving behavior of the vehicle to be unsafe when the security score corresponding to the current driving behavior of the vehicle is lower than the preset early warning threshold, the method further comprises:
   sending security low-score early warning information.

5. The method of claim 1, further comprising:
   acquiring a moment when an insecurity is generated during a historical driving process of the vehicle, and the security marking score and historical driving data corresponding to the moment when the insecurity is generated;
   determining the driving behavior feature data corresponding to the moment when the insecurity is generated according to the historical driving data corresponding to the moment when the insecurity is generated; and
   taking the driving behavior feature data and the security marking score corresponding to the moment when the insecurity is generated as a piece of training data, and adding it to the first training set.

6. The method of claim 5, wherein the acquiring a moment when an insecurity is generated during a historical driving process of the vehicle, and the security marking score and historical driving data corresponding to the moment when the insecurity is generated, comprises:
   acquiring overall driving process data and user insecurity description information corresponding to a plurality of historical driving processes of the vehicle in different driving environments, wherein the user insecurity description information is information recorded during the driving process of the vehicle to describe the insecurity of a user riding the vehicle;
   determining, for any one historical driving process, a moment when preset description information appears in the user insecurity description information and the security marking score corresponding to the moment when the preset description information appears, according to the user insecurity description information corresponding to the historical driving process; and
   determining the historical driving data corresponding to the moment when the preset description information appears according to the overall driving process data corresponding to the driving process;
   wherein the moment when the preset description information appears in the user insecurity description information is a time point at which the insecurity is generated during the historical driving process.

7. The method of claim 1, wherein after the determining whether the current driving behavior of the vehicle is safe according to the security score corresponding to the current driving behavior of the vehicle, the method further comprises:
   determining a current moment as an unsafe moment during the driving process of the vehicle, when the current driving behavior of the vehicle is determined to be unsafe; and
   determining an unsafe level corresponding to the unsafe moment according to the current driving behavior feature data of the vehicle and boundary information of a preset unsafe level.

8. The method of claim 7, wherein after the determining whether the current driving behavior of the vehicle is safe according to the security score corresponding to the current driving behavior of the vehicle, the method further comprises:
   determining the number of the unsafe moment corresponding to each driving scene during a current driving process after the current driving process is ended.

9. The method of claim 8, wherein after the determining the number of the unsafe moment corresponding to each driving scene during a current driving process after the current driving process is ended, the method further comprises:
   inputting the number of the unsafe moment corresponding to each driving scene during the current driving process and the unsafe level corresponding to the unsafe moment into a driving process security detection model, and calculating a security overall score corresponding to the current driving process;
   wherein the driving process safety detection model is obtained by training the neural network model by the number of the unsafe moment corresponding to each driving scene during the historical driving process in a second training set, the unsafe level corresponding to the unsafe moment, and an overall marking score corresponding to the historical driving process.

10. An apparatus for detecting safety of a driving behavior, comprising: a memory, a processor, and a computer program stored on the memory and runnable on the processor, wherein the computer program, when executed by the processor, causes the processor to:
acquire current driving data of a vehicle during a driving process of the vehicle;
determine current driving behavior feature data of the vehicle according to the current driving data of the vehicle, wherein the driving behavior feature data includes a driving scene and driving data, and the driving data includes pose data, speed data and distance data of the vehicle;
input the current driving behavior feature data of the vehicle into a real-time safety detection model, and calculate a security score corresponding to current driving behavior of the vehicle, wherein the real-time safety detection model is obtained by training a neural network model via driving behavior feature data and a security marking score in a first training set; and
determine whether the current driving behavior of the vehicle is safe according to the security score corresponding to the current driving behavior of the vehicle.

11. The apparatus of claim 10, wherein the driving scene at least comprises vehicle following, straight driving, turning, lane changing, making a U-turn, starting, parking and loop driving;
the speed data comprises a lateral driving speed, a longitudinal driving speed, and speeds of the vehicle relative to a road element, a traffic element and an obstacle element;
the distance data comprises distances of the vehicle relative to the road element, the traffic element and the obstacle element.

12. The apparatus of claim 10, wherein the computer program further causes the processor to:
determine whether the security score corresponding to the current driving behavior of the vehicle is lower than a preset early warning threshold;
determine the current driving behavior of the vehicle to be unsafe when the security score corresponding to the current driving behavior of the vehicle is lower than the preset early warning threshold; and
determine the current driving behavior of the vehicle to be safe when the security score corresponding to the current driving behavior of the vehicle is not lower than the preset early warning threshold.

13. The apparatus of claim 12, wherein the computer program further causes the processor to:
send security low-score early warning information.

14. The apparatus of claim 10, wherein the computer program further causes the processor to:
acquire a moment when an insecurity is generated during a historical driving process of the vehicle, and the security marking score and historical driving data corresponding to the moment when the insecurity is generated;
determine the driving behavior feature data corresponding to the moment when the insecurity is generated according to the historical driving data corresponding to the moment when the insecurity is generated; and
take the driving behavior feature data and the security marking score corresponding to the moment when the insecurity is generated as a piece of training data, and add it to the first training set.

15. The apparatus of claim 14, wherein the computer program further causes the processor to:
acquire overall driving process data and user insecurity description information corresponding to a plurality of historical driving processes of the vehicle in different driving environments, wherein the user insecurity description information is information recorded during the driving process of the vehicle to describe the insecurity of a user riding the vehicle;
determine, for any one historical driving process, a moment when preset description information appears in the user insecurity description information and the security marking score corresponding to the moment when the preset description information appears, according to the user insecurity description information corresponding to the historical driving process; and
determine the historical driving data corresponding to the moment when the preset description information appears according to the overall driving process data corresponding to the driving process;
wherein the moment when the preset description information appears in the user insecurity description information is a time point at which the insecurity is generated during the historical driving process.

16. The apparatus of claim 10, wherein the computer program further causes the processor to:
determine a current moment as an unsafe moment during the driving process of the vehicle, when the current driving behavior of the vehicle is determined to be unsafe; and
determine an unsafe level corresponding to the unsafe moment according to the current driving behavior feature data of the vehicle and boundary information of a preset unsafe level.

17. The apparatus of claim 16, wherein the computer program further causes the processor to
determine the number of the unsafe moments corresponding to each driving scene during a current driving process after the current driving process is ended.

18. The apparatus of claim 17, wherein the computer program further causes the processor to:
input the number of the unsafe moments corresponding to each driving scene during the current driving process and the unsafe level corresponding to the unsafe moments into a driving process security detection model, and calculate a security overall score corresponding to the current driving process;
wherein the driving process safety detection model is obtained by training the neural network model by the number of the unsafe moment corresponding to each driving scene during the historical driving process in a second training set, the unsafe level corresponding to the unsafe moment, and an overall marking score corresponding to the historical driving process.

19. A device for detecting safety of a driving behavior, comprising:
a memory, a processor, and a computer program stored on the memory and runnable on the processor,
wherein the method according to claim 1 is implemented when the processor runs the computer program.

20. A computer readable storage medium, storing a computer program that, when being executed by a processor, implements the method according to claim 1.

\* \* \* \* \*